Figure 3:
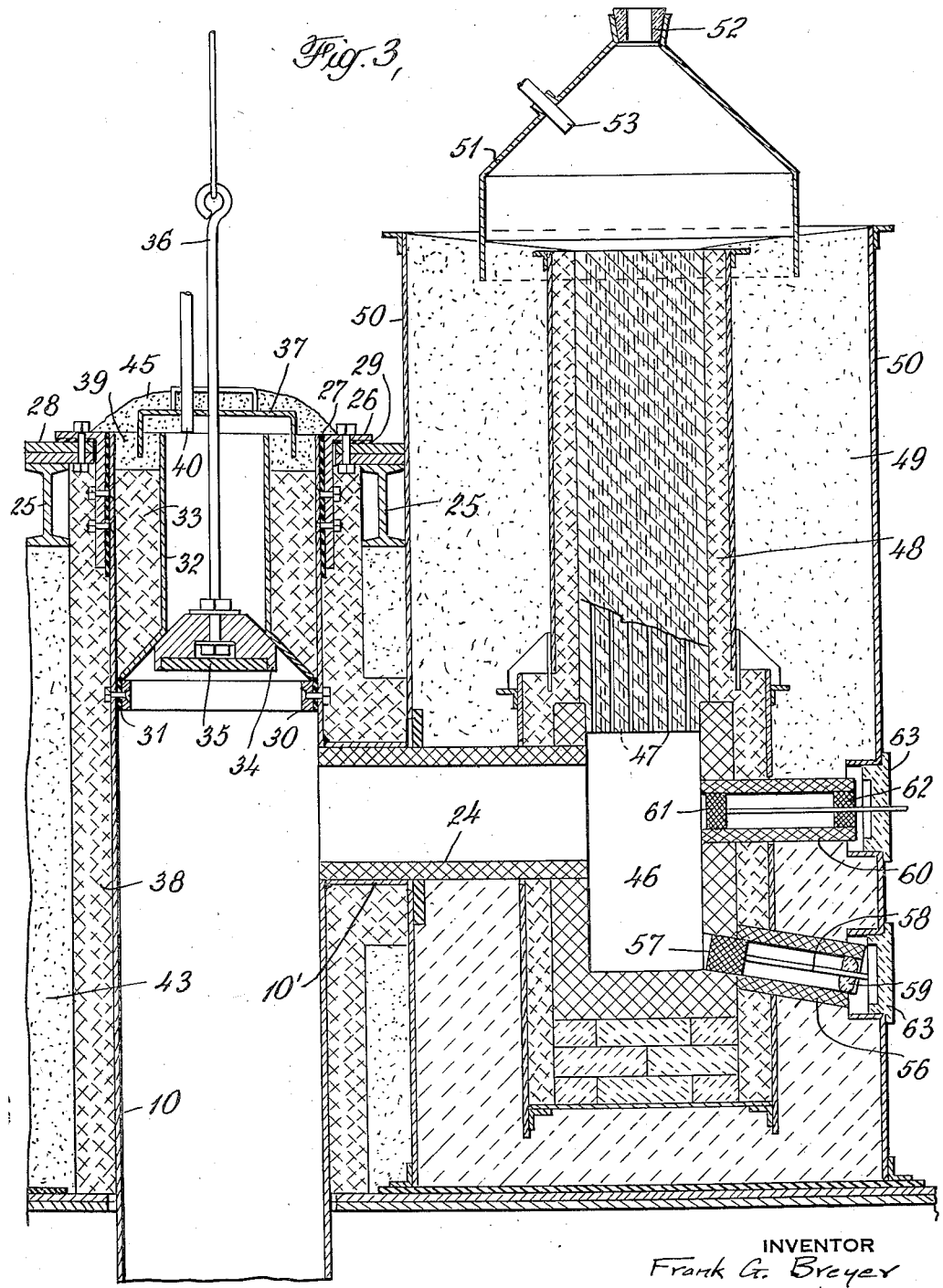

Nov. 17, 1931.  F. G. BREYER  1,832,356
REDUCING ZINCIFEROUS MATERIALS
Original Filed Feb. 17, 1927  3 Sheets-Sheet 1
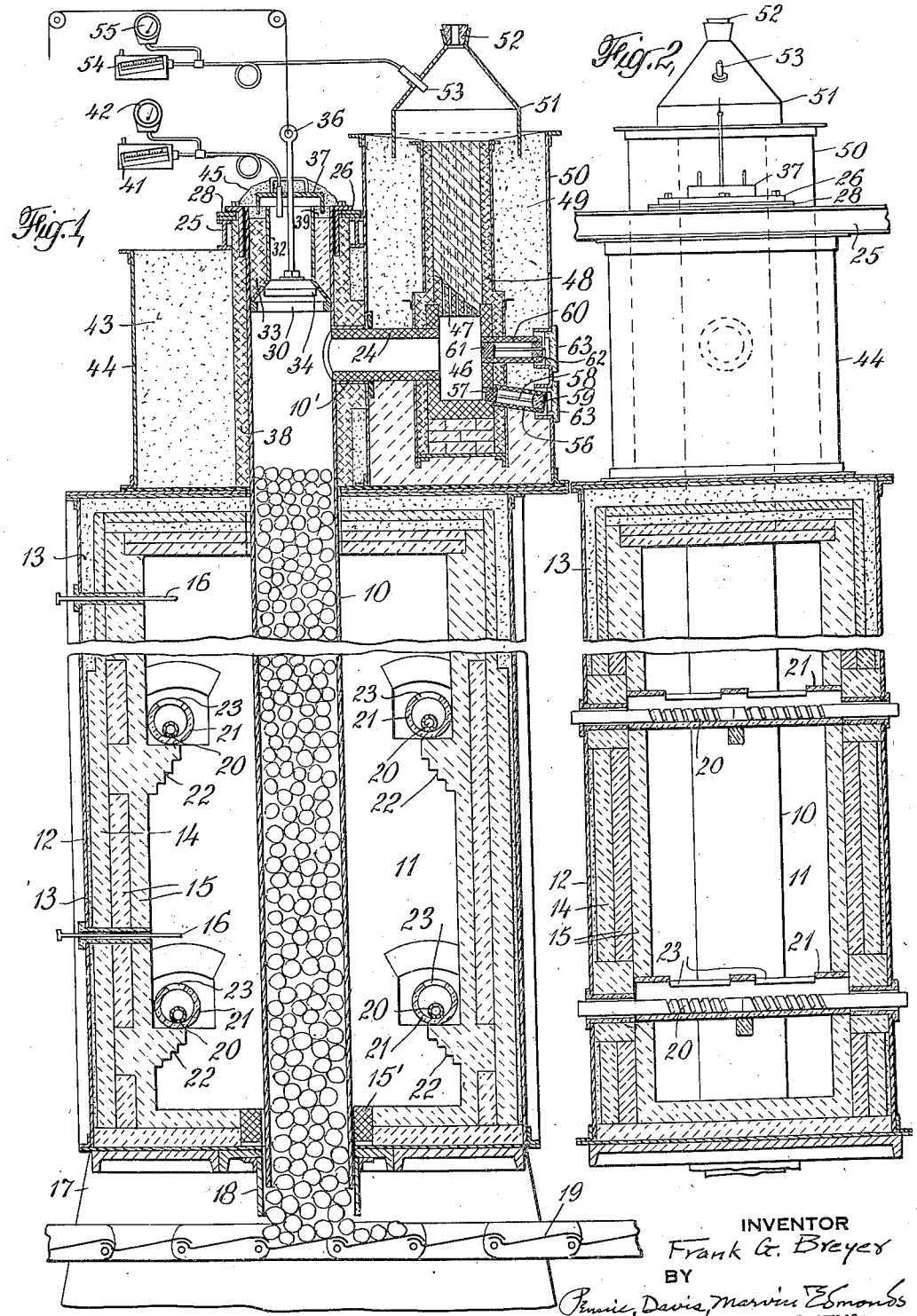
INVENTOR
Frank G. Breyer
BY
Pennie, Davis, Marvin & Edmonds
ATTORNEYS Nov. 17, 1931. F. G. BREYER 1,832,356
REDUCING ZINCIFEROUS MATERIALS
Original Filed Feb. 17, 1927 3 Sheets-Sheet 2

INVENTOR
Frank G. Breyer
BY
Pennie, Davis, Marvin & Edmonds
ATTORNEYS

Nov. 17, 1931.  F. G. BREYER  1,832,356
REDUCING ZINCIFEROUS MATERIALS
Original Filed Feb. 17, 1927   3 Sheets-Sheet 3
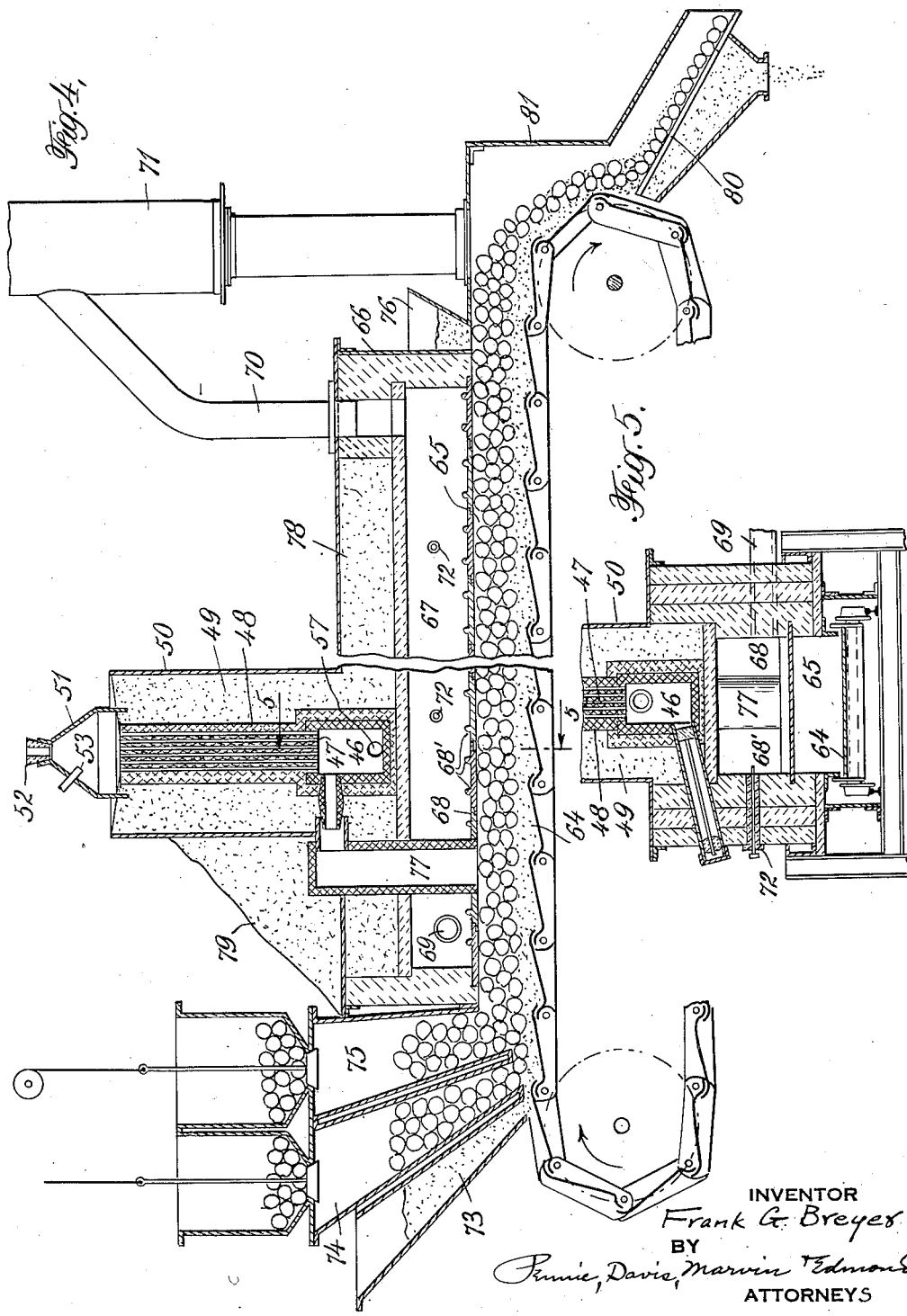
INVENTOR
Frank G. Breyer
BY
Pennie, Davis, Marvin Edmonds
ATTORNEYS Patented Nov. 17, 1931

1,832,356

UNITED STATES PATENT OFFICE

FRANK G. BREYER, OF NEW CASTLE, DELAWARE, ASSIGNOR TO THE NEW JERSEY ZINC COMPANY, OF NEW YORK, N. Y., A CORPORATION OF NEW JERSEY

REDUCING ZINCIFEROUS MATERIALS

Original application filed February 17, 1927, Serial No. 168,914. Divided and this application filed March 22, 1929. Serial No. 349,081.

This invention relates to the reduction or smelting of zinciferous materials and has for its object the provision of certain improvements in the reduction or smelting of such materials.

Zinc metal or spelter, when produced by the reduction of oxidized zinc ores at high temperatures, is almost universally made at the present time in zinc distillation or spelter furnaces having a number of relatively small retorts to the outer ends of which small condensers are attached. The retorts are usually mounted at a slight inclination, usually inclined downward from the butt or closed end toward the open or outer end. The retorts are made of heat refractory material, such as fire clay, silicon carbide or the like, and are externally heated by fire gases of a temperature around 1400° to 1500° C. In the operation of these furnaces, the retorts are charged (usually once in 24 hours) with mixed zinc ore and coal. The part of the charge to be first worked off is the ring of charge immediately adjacent the heated inner wall of the retort. While this ring of charge is working off, its temperature will not rise materially above the temperature at which the particular charge actively reduces, due to the fact that the heat energy is consumed in bringing about the reduction. When, however, the ring of charge is largely worked-off, the temperature of the worked-off charge will rise because there is little, if any, other heat absorption taking place. As the temperature of this ring rises heat begins to flow more rapidly into the next inner ring of charge where it in turn is absorbed at the active temperature of reaction level. By thus progressively working-off the inner concentric rings of charge and further heating and raising the temperature of the outer rings of spent charge or residue, the working-off of the charge ultimately progresses to the center or core of the retort.

The progressively worked-off rings of charge consist for the most part of exhausted coal ash and exhausted zinc ore. The exhausted coal ash, which is very loose and cellular as a consequence of the carbon being burned out of it, and the exhausted zinc ore, which is also very loose and cellular as a consequence of the zinc being volatilized out of it, constitute a most efficient heat insulator and the temperature of the retort wall must consequently be raised very high in order to drive the heat necessary to reduce the ore in the core of the retort through this insulating residue and into the core in a given time. In the case of the ordinary zinc or spelter retort (6" to 9" in diameter) operating with a loose or unagglomerated charge, this is a day's (approximately 24 hours) operation. But even with this length of time allowed for the penetration of the heat, the temperature of the retort wall necessary to drive the heat into the core of the charge is so high that the exhausted ore and coal ash in the outer ring next to the retort wall fuse and slag to the wall of the retort, thus causing bridging and hanging up of the charge, lowering the heat conductivity of the retort wall and making the removal of the exhausted charge difficult.

The spent residues are removed from the retorts with considerable difficulty and have to be manually pulled or scraped from the retort with a specially constructed tool. These spent residues are frequently slagged and form very undesirable adhesions to the walls of the retorts. In addition to the labor difficulty of charging and discharging the retorts and the long time element—24 hours for the complete working off of a retort charge—this heretofore customary practice effects far from complete elimination of the available zinc from the zinciferous material of the charge. A comparatively large amount of this uneliminated zinc remains behind with the spent residues and is lost.

So far as I am aware, the reducing chambers in the heretofore customary commercial zinc distillation furnaces have been universally constructed of or lined with heat refractory material, such as fire clay, silicon carbide, or the like. The usual spelter retorts require in their manufacture the highest skill of the ceramist, and the fabrication, curing and burning of these retorts take relatively long periods of time.

The progress of recent years in the commercial smelting of zinc ores to produce zinc metal has been largely in two directions, viz: the use in furnace construction of refractories more resistant to high temperatures and the working of less easily fusible charges. The development of the commercial art in these directions has been motived by the general appreciation that the higher the temperature level at which heat can be driven into a charge the more charge can be put into a given sized retort and the more complete the reduction and volatilization of the zinc content of the ore.

In order to utilize heat at higher temperature levels, it was first necessary to construct the heating chambers or laboratories, in which the retorts are placed and in which the heat is generated, of more temperature resistant materials. Accordingly better fire clays were used for the retort supports and chamber arches, and then entirely different refractories, namely, silica and silicon carbide, were substituted for fire clays. The best practice to-day is to use silica arches where the brick is cooled on one side and silicon carbide center walls where the entire brick is in the hot zone. At the same time that the heating chamber was being made more temperature-resistant, the retorts were also being improved. The use of better clays and more particularly the increased use of silicon carbide has resulted in the production of retorts which will stand much higher temperatures than formerly without sagging or slagging away.

The second move to permit the use of higher temperatures in zinc smelting has been in the direction of improving the ore and carbonaceous reducing fuel in the mixed charge with the view of making the charge less fusible. With respect to the ore, this has been accomplished by better milling practice in which more of the readily fusible and barren constitutents are separated from the zinc minerals. Better blending of different ores has also brought about a lessened tendency for the mixed charge to fuse at the prevailing smelting temperatures. The carbonaceous reducing fuel has been improved by selection of materials of relatively low ash content, as well as by jigging or tabling carbonaceous materials of relatively high ash content.

Consequently, we find that temperature levels of zinc smelting operations have materially increased in the past ten years, particularly in the more progressive smelters. In contrast with this full appreciation of the advantages of higher temperature operations and the commercial realization of these advantages, zinc smelting at lower temperatures and particularly temperatures below 1200° C. has received little, if any, serious commercial consideration either in the field or in the literature. This is undoubtedly due to the fact that it has not heretofore been considered possible to work-off an economical size of charge for the production of zinc metal even in a 24 hour cycle with heat supplied at temperature levels less than 1250 to 1400° C. As a matter of fact, these high temperatures are actually necessary if heat is to be driven through a loose and highly insulating charge and residue such as is encountered in the present customary spelter retort practice.

As a result of exhaustive investigations and experiments I have found that with suitable carbonaceous reducing agents, or suitable reducing and carbon activating agents and under proper conditions of fineness of the zinciferous and carbonaceous materials and proper mixing conditions, appreciable amounts of zinc are reduced from its compounds at temperatures below 950° C., and that the rate of evolution of zinc becomes substantial at about 950° C. and can be brought up to such a point that 90 per cent, or more elimination can be made in less than 24 hours at temperatures around 1050° C. The step of making reduction or smelting at such relatively low temperatures entirely commercial, is one of getting heat at that temperature level to a sufficiently large quantity of charge at approximately the same time. This I have found is possible by agglomerating the charge of mixed zinciferous and carbonaceous materials and utilizing to the maximum extent the three modes of securing heat transfer (namely, rapid transfer of heat by heat carrying gases flowing with considerable velocity through the voids of the agglomerated charge, rapid radiation of heat across the voids between the agglomerates, and good conduction of heat through individual densified agglomerates) discussed at length in the copending patent application, Serial Number 163,902, filed January 27, 1927.

My present invention accordingly involves reducing or smelting an agglomerated charge of mixed zinciferous and carbonaceous reducing materials by supplying the heat necessary for reduction at a temperature level or potential not in excess of 1150° C. With such relatively low operating temperatures, I have moreover discovered that the reduction may be conducted in reducing chambers in which such wall or walls thereof as are exposed to the hot charge and the hot gaseous products arising therefrom are constructed of metal, more particularly wrought iron, nickel-chromium, nickel-iron, chromium-iron and nickel-iron-chromium alloys. Accordingly, the invention further involves reducing or smelting an agglomerated charge of mixed zinciferous and carbonaceous reducing materials in a metallic reducing chamber wherein the heat necessary for reduction is supplied at a temperature level or potential not above 1150° C.

I have found that two conditions are of particular significance in making commercially possible the reduction of zinciferous material at such relatively low temperatures as contemplated by the invention. The first of these conditions involves getting the heat at the relatively low temperature of reduction to a relatively large amount of charge at the same time. In practice, this may be effected by agglomerating the charge of mixed zinciferous and carbonaceous materials and so conducting the reducing operation in a chamber of such dimensions and configuration as to obtain the fullest possible advantage of the rapid transfer of heat throughout the charge by currents of hot gases. The second condition involves making the mixed charge of zinciferous and carbonaceous materials as easily reducible as possible, and thereby lowering the temperature at which zinc is evolved at a given rate. This may be effected in several ways, as for example, by activating the carbonaceous reducing agent, as for example by caking carbonaceous caking materials, or by the addition of carbon activating agents like water vapor, hydrogen, alkalies, salt, iron oxide and the like, or by adding hydrogen, water vapor, ammonium chloride, zinc chloride and the like to the gases passing through the charge, or by more thorough comminution of the zinciferous and carbonaceous materials, or by more intimate admixture of these materials.

While the advantages of high temperature smelting, or reduction, as hereinbefore pointed out, are important and have accomplished considerable economies in practice, a consideration of the possible economies that can be obtained by low temperature reduction makes the latter practice decidedly attractive for many reasons. In the first place, low temperature reduction, when proper regard is taken of mechanical and thermal stresses, makes possible the use of metal walls for the reducing chamber, with all the advantages that metal has due to its ability to be machined, bolted, welded or otherwise fitted together into assemblies of considerable size.

The second important advantage of low temperature reduction, and perhaps of even greater importance than the first I have mentioned, is that it makes possible the working of cheap low grade ores for the recovery of zinc metal, which have not heretofore been considered available for such purpose, due to their tendency to fuse down, slag, bore through the retort or actually run out of the front of the retorts like water, when smelted at the prevailing relatively high temperature levels. In the practice of my present invention, I have found it possible at the relatively low temperature levels which I utilize to eliminate 90% or more of the zinc present in the most refractory and low grade zinciferous products that I have encountered, and this has been accomplished by bringing the agglomerated charge progressively through the reducing chamber without any fusion or slagging whatever, and discharging the still agglomerated residues in what the zinc metallurgist would call a dry condition. An important factor closely related to the aforementioned second advantage of low temperature reduction is the fact that alkalies and other materials that have a tendency to lower the fusing or slagging temperature of the charge also have a marked beneficial effect upon the rate at which the zinc is reduced at low temperatures. By working at low temperatures, the good effect of the alkali and similar additions may be realized without the harmful after effects of slagging the exhausted residue.

A further important advantage of low temperature reduction is that at the lower temperatures there is considerably less volatilization of materials which interfere with the subsequent condensation of zinc vapor and lessen the purity of the zinc metal collected. Thus, such volatile substances as sulfur-oxygen compounds, silicon and sulfides of zinc, lead and iron have a tendency to coat or deleteriously modify the surface of the condensed droplets of zinc in the condenser, and thereby seriously interfering with the coalescence of these droplets.

Another important advantage of low temperature reduction is the fact that the lower the temperature of the heating and reducing chambers the more economical will be the utilization of the heat from whatever source it may be supplied. Furthermore, such relatively low temperatures permit the use of less temperature refractory and consequently less costly and in many cases better heat-insulating materials of furnace construction.

In the accompanying drawings I have illustrated two different types of furnaces adapted for the practice of the invention. It is to be understood that the drawings are illustratory, and that the invention may be practiced in other types of furnace. In the drawings Fig. 1 is a front sectional elevation and Fig. 2 is a side sectional elevation of a vertical retort furnace, Fig. 3 is an enlarged sectional elevation of the top of the furnace of Figs. 1 and 2 and the associated condenser, Fig. 4 is a longitudinal sectional elevation and Fig. 5 is a transverse sectional elevation of a horizontal traveling hearth furnace.

The vertical retort furnace illustrated in Figs. 1, 2 and 3 of the drawings comprises a vertically disposed and suspended cylindrical retort 10 of metal, such as wrought iron. The retort 10 is surrounded, for the greater part of its length, by a heating chamber or laboratory 11. The heating chamber 11 is built within a furnace structure comprising an outer steel shell or casing 12, a layer of powder 13, an intermediate lining 14 of sil-o-cel brick or the like, and an inner lining 15 of one or more layers of brick or the like. Appropriate openings are provided through the wall of the furnace structure permitting the insertion of pyrometers 16 within the heating chamber 11, for ascertaining and appropriately controlling the temperature throughout the length of this chamber.

The furnace structure is mounted on an appropriate foundation 17. A cylindrical extension 18 is bolted, or otherwise appropriately secured, to the underside of the bottom steel plate of the furnace structure and serves as a guide for an extension of the retort 10 below the bottom of the furnace structure. A pan conveyor 19 is operatively mounted directly beneath the extension 18 and is adapted to withdraw the worked-off charge or spent residue from the bottom of the retort 10 and convey the same from underneath the furnace structure to appropriate means of discharge.

Any appropriate means may be employed for externally heating the metal retort 10, due regard being had for the particular metal of which the retort is made. Thus, for example, the products of combustion from burning fuel, such as coal, oil, or gas, may be conducted through the heating chamber 11 around the metal retort 10 and to an appropriate stack. Heat may be generated in the metal retort itself, as in an electric induction furnace, the metal retort acting as the absorber and converter to heat of the electromagnetic energy radiated from a surrounding primary electric circuit. In the apparatus illustrated in the accompanying drawings having a wrought iron retort, the heating of the retort is preferably effected by graphite resistors. The electric heating units comprise three pairs of graphite resistors 20 positioned at different levels within the heating chamber 11. The resistors 20 are hollow for an appropriate length thereof and have a spiral slot so as to provide a helical resistance path for the flow of the electric current. The resistors 20 of each pair are connected together on one side of the furnace structure and at the opposite side of the furnace structure the two resistors are connected respectively to opposite terminals of the source of electric energy.

The resistors 20 are supported within carbofrax tubes 21. The ends of these tubes rest on shelves in the opposite walls of the furnace structure and the centers of the tubes are supported on shelves 22. The tubes 21 have openings 23 in the top thereof. This arrangement of the resistors within the tubes produces controlled and uniform heating throughout the length of the retort 10.

The top of the metal retort 10 extends some distance above the top of the furnace structure. It is important that this extension of the retort 10 be carefully insulated to prevent undue radiation of heat therefrom and, more particularly in the case of a wrought iron retort, be protected against oxidizing influences. The extended upper portion of the retort 10 has a lateral outlet pipe 10', also of metal and preferably welded to the retort. A graphite cylindrical sleeve 24 fits snugly within the outlet 10' and serves to conduct the gaseous products generated in the retort 10 to a multi-channelled condenser.

The metal retort 10 is hung or suspended in any appropriate manner from I-beams 25 of the structural frame work of the furnace. A series of metal brackets 26 are bolted or otherwise appropriately secured to the top of the retort 10, with asbestos felt or other appropriate heat insulating material 27 disposed between the surface of the retort and the brackets. The brackets 26 are secured to a circular plate 28 resting on the I-beams 25 and having a central opening of somewhat greater diameter than the diameter of the retort 10. Asbestos felt or other appropriate heat insulating material 29 is preferably disposed between the adjacent surfaces of the brackets 26 and the plate 28.

A metal ring 30 is bolted to the retort 10 on the inside thereof and above the outlet 10'. Heat insulating material 31, such as asbestos, is interposed between the ring 30 and the retort. An inverted sheet-metal funnel 32 rests on the ring 30 and the space between the retort and the funnel, above the ring 31, is filled with hardened carbon paste 33.

A truncated conical plug or bell 34 is movably suspended within the flared bottom portion of the inverted funnel 32. The plug 34 is preferably made of graphite with its lower surface recessed and filled with heat refractory material 35. An operating rod 36 is secured at its lower end to the plug 34 and is adapted to be raised and lowered for charging the retort as more fully explained hereinafter.

The upper extending portion of the retort 10 and its lateral outlet 10' are surrounded by hardened carbon paste 38. A cover 37, of sheet metal or the like, is provided for the top of the funnel 32, and the lower edge or rim of this cover is embedded in dust coal 39 on top of the hardened carbon paste 33. A pressure responsive device 40 extends through the cover 37 into the upper end of the funnel 32 and is operatively connected to a pressure gauge 41 and a pressure recording instrument 42. The upper extending portion of the retort 10 with its encompassing layer of carbon paste 38 is surrounded by dust coal 43 appropriately confined by a sheet metal casing 44. A layer of dust coal 45 is also thrown over the top of the cover 37.

The multi-channeled condenser shown in the accompanying drawings is more particularly described in the copending patent application, Serial No. 167,135, filed Feb. 10, 1927. This condenser comprises a gas distributing and molten metal collecting chamber 46 having a gas inlet in communication with the gas outlet 24 from the retort 10. A multi-tubular condensing tower 47 is mounted on top of the chamber 46 with its multiplicity of tubes or channels in communication with the chamber. The chamber 46 and tower 47 are built of graphite and are surrounded by a layer of hardened carbon paste 48, which in turn is surrounded by a mass of dust coal 49 approximately confined by a metal casing 50. A sheet metal hood 51 covers the top or gas exit ends of all the channels in the tower 47. The lower edge or rim of the hood 51 is embedded to a desired extent in the surrounding dust coal 49. The hood has a top opening in which plugs 52 having central orifices of different (graduated) sizes may be inserted. A pressure responsive device 53 is inserted in the hood 51 and is operatively connected to a pressure gauge 54 and a pressure recording instrument 55. The chamber 46 is provided near its bottom with a tap hole 56 through which molten zinc metal may be withdrawn from the condenser from time to time. The tap hole 56 is normally closed by an inner graphite plug 57 secured to a manipulating rod 58 and an outer plug 59 of fire clay or the like. The chamber 46 is also provided with a clean-out opening 60 normally closed by an inner graphite plug 61 and outer plug 62. The outer ends of the tap hole 56 and clean-out opening 60 are preferably covered with heat-insulating caps 63.

The lower end of the metal retort 10 extends downwardly through the bottom lining of the heating chamber 11 and is not supported by or otherwise tied into the lining, but on the contrary is free to move, if it will, with respect to the lining. This lower end of the retort is sealed about its circumference and adjacent the bottom lining by a ring of brick, hardened carbon paste, graphite or the like 15' which is non-binding on the retort. It will thus be seen that the retort is supported entirely from its top and is at no other place secured to or tied into the furnace structure. The retort is therefore free to extend, expand or contract as it will.

The top of the metal retort is carefully insulated to prevent loss of heat and is furthermore carefully protected against oxidizing influences and against the alloying and embrittling action of condensed zinc metal. Thus, while the metal retort is red hot throughout that part of its length exposed to the source of heat and the hot gaseous products of the reduction, its top is relatively cold and black. The upper extending portion of the retort is carefully insulated by asbestos felt or the like from all adjacent heat-conducting media, thereby reducing to a minimum the loss of heat by conduction through and away from this portion of the retort. The hardened carbon paste 38 and 33, surrounding the outer and inner surfaces of the top portion of the retort, acts both as a heat insulator (with respect to metal) and as a maintainer of reducing conditions around the upper portion of the retort. The charging structure at the top of the retort effectively protects this relatively cold portion of the retort against the alloying and embrittling influences of condensed zinc metal.

The metal retort 10 may be made of wrought iron, steel, alloy steel and the like. The retort may be made of several units or lengths welded or otherwise appropriately fastened together. I have secured very satisfactory results with a wrought iron retort to which the heat for the reduction of the agglomerated charge was supplied at a temperature of about 1050 to 1100° C. Various nickel-chromium iron alloys are available in the fabrication of the metal retort 10. Thus, I have found hybnickel particularly well suited for the metal retort, as well as nichrome and duralloy. The approximate compositions of these alloys are as follows:

|  | Hybnickel | Nichrome | Duralloy |
| --- | --- | --- | --- |
| Nickel | 38% | 65 | 10 |
| Chromium | 17 | 13 | 25 |
| Iron | 45 | 22 | 61 |

In practicing the invention in the furnace illustrated in Figs. 1, 2 and 3, the mixed charge of zinciferous and carbonaceous materials is agglomerated and progressively passed through the metal retort or reducing chamber 10. The agglomeration of the mixed charge, including the size, shape, strength and manner of making the agglomerates, as well as the progression of the agglomerates through the retort are conducted in accordance with the principles described in the aforementioned application, with the view of securing the optimum conditions for the rapid transfer of heat throughout the agglomerated charge by currents of hot gases. Thus, the agglomerated charge passes through the retort without substantial breaking down of the agglomerate and worked-off residues are discharged from the bottom of the retort as required for the charging thereto of fresh agglomerates; the discharged residues being in a dry condition and for the most part in the form of agglomerates.

In accordance with the characteristic feature of the invention, the heating chamber or laboratory 11 of the furnace is maintained at such a temperature that the metal wall of the retort does not exceed about 1150° C. This is accomplished by close observation of the temperatures throughout the heating chamber as indicated by the pyrometers 16 and by careful regulation and control of the heating means. In this manner heat is supplied to the agglomerated charge at temperature levels or potentials not above 1150° C., and, in consequence of the favorable conditions existing in the progressively advancing charge for the transfer of heat therethrough by currents of hot gases, the heat supplied at this relatively low temperature level is rapidly brought to all parts of the charge.

The reduction or working-off of the agglomerated charge in the retort 10 is a substantially continuous operation. From time to time as required, fresh agglomerates are charged into the top of the retort following the discharge of an appropriate amount of spent residues from the bottom of the retort. In charging fresh agglomerates, the cover 37 is raised and the neck of the charging funnel 32 filled with agglomerates. The cover is then lowered to close the top of the funnel 32 and the plug 34 lowered permitting the agglomerates to drop into the retort. The plug 34 is then raised and the sequence of operations repeated until the desired amount of charge has been introduced into the retort. The charging operations are thus conducted with a minimum loss of zinc carrying gases.

The primary sealing of the charging end of the retort is effected by the plug 34 seating in the flared portion of the funnel 32, and the final seal is effected by the cover 37 with its rim embedded in the dust coal 39 and its top layer of dust coal 45. The metal-laden gases from the retort 10 flow into the multi-channelled condenser where appropriate temperature and pressure conditions are maintained for good metal condensation in accordance with the principles described in the aforementioned application, Serial No. 163.902.

The following specific example will further illustrate the principles of the present invention as practiced in an apparatus of the form shown in Figs. 1, 2 and 3, although it is to be understood that this example is merely illustrative and in no sense restrictive of the invention.

The retort 10 was a wrought iron tube 29 feet long, 20 inches internal diameter with a wall thickness of ⅜ inch. The outlet pipe 10' was 12 inches in diameter and was about 3 feet from the top of the retort. The graphite sleeve 24 was 8 inches in diameter. The temperature in the heating chamber or laboratory 11 was approximately 1075° C.

The charge was made up of approximately 60 parts by weight of finely divided zinc silicate ore (containing from 45–50% of zinc) and 40 parts by weight of a caking coal (containing about 18% volatile matter) and 3% of waste sulfite liquor (50% solids). Approximately 80% of the zinc ore passed through a 20 mesh screen. The caking coal (Consolidation Georges Creek Big Vein) was pulverized so that approximately 80% passed through 20 mesh screen. The zinc ore and coal were placed in a revolving mixer of the kind employed for the mixing of concrete and thoroughly mixed. From the revolving mixer, the material was dumped directly into a dry pan Chilean mill and subjected to the mixing and comminuting action of the mill for some minutes. From the Cilean mill, the material was taken to a briquetting press and formed into briquettes by a compressive force of approximately 2,000 pounds to the square inch. The briquettes were approximately spherical and about 2¾ inches in diameter.

The briquettes, without drying, were charged into an externally heated vertical coking retort. In this retort, the briquettes were subjected to a coking temperature of about 700° C. In the coking operation, it is desirable to leave behind in the coked product as high a percentage as possible of the non-condensible volatile substances, and at the same time eliminate as completely as possible the tars. As a result of the coking action, the intimately mixed particles of ore and coal are firmly held together by the binding action of the coke formed in the coking operation.

The coke agglomerates were transferred without substantial loss of heat from the coking retort to the vertical smelting retort, and introduced therein at the rate of approximately 300 pounds at intervals of 1½ hours. The heating of the retort was controlled so as to maintain a temperature of approximately 1075° C. on the outside of the retort, and no slag was formed and no fusion of the agglomerates took place.

The gaseous products of the reaction for the most part zinc vapor and carbon monoxide gas with from 0.2–0.8% of carbon dioxide pass through the condenser where the zinc vapor is condensed, collected and periodically withdrawn as zinc metal. Although the charging of the furnace was intermittent (every 1½ hours), its operation as a whole was continuous, the metal retort 10 being at all times filled with an agglomerated charge undergoing reduction.

Spent residues were withdrawn from the bottom of the retort preceding each charging operation in such amount as required for the subsequent charging of approximately 300 pounds of fresh agglomerates. For the most part, these residues as discharged retained their original briquetted form and were free and non-adherent (what the zinc metallurgist would call a dry residue). The amount of zinc in these residues averaged about 4%, thus representing an elimination or extraction of over 90% of the total zinc in the original ore. 96% of the zinc eliminated or extracted from the ore was condensed and collected as slab zinc metal; the remaining 4% being for the most part recoverable as zinc oxide and blue powder.

The apparatus illustrated in Figs. 4 and 5 of the drawings comprises a traveling hearth 64, of the pan conveyor type, constituting the bottom of a relatively long reducing chamber 65 of rectangular section. The reducing chamber is embodied in an appropriate furnace structure 66 having a heating flue 67 overlying the top wall or roof 68 of the reducing chamber.

The wall 68 is constructed of metal. This metal wall is preferably built up of a plurality of sections or units with gas-tight joints. The adjacent edges of the metal sections or units are preferably overlapped and if necessary the joints between sections may be filled with cement in order to make the wall or roof 68 as a whole substantially gas-tight. Any of the metals and alloys hereinbefore mentioned as suitable for the metal wall of the reducing chamber may be used in the construction of the wall or roof 68. Since this metal wall bridges between supports, I prefer to construct it of cast metal, and in order to prevent sagging at the reducing temperatures, I prefer to provide transverse strengthening ribs 68' at frequent intervals, say 12 inches apart, throughout the length of the wall 68.

Fuel burners 69 extend through the side wall (or walls) of the furnace structure into the flue 67, and the hot products of combustion from these burners flow through the flue to an exhaust conduit 70 communicating with a stack 71. Pyrometers 72 are inserted at appropriate points in the flue 67 for determining and controlling the temperature of the heating gases passing therethrough.

The pan conveyors, as they enter the reducing chamber travelling in the direction indicated by the arrows, are covered with an appropriate layer of fine material delivered onto the pans from a hopper 73 at the charging end of the furnace. Worked-off or spent agglomerates are delivered onto the bed of fines from a hopper 74 adjacent the hopper 73. The spent agglomerates become partially embedded in the fines and to this extent prevent the embedding of agglomerates undergoing reduction. The agglomerated charge of mixed zinciferous and carbonaceous reducing materials is delivered from a hopper 75, adjacent the hopper 74, onto the layer (approximately one agglomerate deep) of spent agglomerates. The layer of spent agglomerates interposed between the bed of fines and the overlaying layer of agglomerates undergoing reduction insures the desired porosity of the entire bed of these latter agglomerates, and consequently, the efficient transfer of heat by currents of hot gases throughout the bed of these agglomerates. At the discharge end of the furnace additional fine material is charged from a hopper 76 onto the spent residues as they emerge from the reducing chamber.

A gas outlet 77 communicates with the top of the reducing chamber 65 near the charging end and extends upwardly through the flue 67 and the overlying layer or layers 78 of heat refractory material. The upper end of the gas outlet 77 communicates through a horizontal passage with the condenser for the metallic vapor. Such portions of the gas outlet 77 as extend beyond the heat protecting influence of the furnace structure are covered with an appropriate mass 79 of heat insulating material, such as dust coal, coke dust, or the like.

The condenser is of the multi-channelled carbon tower type such as described in connection with Figs. 1, 2 and 3, and similar elements are indicated by the same reference characters.

The spent residues and fines are discharged from the pan conveyor onto a grizzly 80 through which the fines pass while the agglomerates slide down the grizzly and are appropriately disposed of. The fine material passing through the grizzly is conveyed back to the fine hoppers 73 and 76 in such relative amounts as required. An appropriate amount of the spent or worked off agglomerates is conveyed back to the hopper 74. The discharge end of the furnace is enclosed by a sheet metal casing 81 and any dust resulting from the discharging operation is carried from the casing 81 to the stack 71 or to any other suitable dust collecting system.

In practicing my present invention, the apparatus of Figs. 4 and 5 is operated as follows: The temperature in the flue 67 is carefully controlled and regulated so that heat is supplied to the agglomerated charge in the reducing chamber through the metal wall or roof 68 at a temperature level not above 1150° C. The pan conveyor 64 moves at a relatively slow rate in the direction of the arrows, and at the charging end of the furnace receives a layer of fine material and a layer of spent agglomerates upon which is superimposed the agglomerated charge to be worked-off. The agglomerated charge substantially fills the reducing chamber 65 above the layer of spent agglomerates and is progressively advanced through the chamber by the movement of the pan conveyor. Heat is transferred and conducted into the agglomerated charge from the heated roof or top metal wall 68 by currents of hot gases in the manner characteristic of the aforementioned invention. The mixture of metallic zinc vapor and carbon monoxide gas (resulting from the reduction of the zinciferous material in the agglomerated charge) passes from the reducing chamber through the gas outlet 77 into the multi-channelled carbon condenser, where substantially all of the metallic zinc vapor is condensed to molten zinc metal. From time to time, molten zinc metal is withdrawn from the condenser through the tap hole 56.

When the metal wall or walls of the reducing chamber are made of rolled or wrought metal, it (or they) will preferably be hung or suspended from above. Rolled or wrought metal at high temperature has a certain relative lack of stiffness as compared with cast metal at high temperature, but when hung or suspended, the rolled or wrought metal wall may at high temperatures uninterruptedly expand or stretch downwardly. In this way, sagging, bulging, or other malformation of the chamber wall is avoided, and chamber walls of less thickness may be utilized.

When the chamber wall is made of cast metal, it is generally preferable, due to the weight and stiffness of cast metal at high temperatures, to support it from the bottom or lower end, leaving the upper end unhampered for expansion and contraction. Using cast metal a thicker chamber wall may be utilized, and this thicker wall combined with the greater stiffness in compression of cast metal permits the use of higher temperatures than is possible when the metal is in tension. When the metal chamber wall spans or bridges between supports, cast metal is preferable.

The metal chamber wall may be made of a single piece of metal or may be made up of several units or sections appropriately united or joined. With reducing chambers of considerable size, it is preferable to use several units or sections in building up the metal wall. With rolled or wrought metal these units are preferably welded together, while with cast metal, the units are simply fitted together with lapsed joints if desired and with an appropriate cement in the joints if necessary.

The metal walled reducing chamber, in addition to its lower cost and the facility with which large assemblies with side gas outlets and the like may be built, has the further important advantage over chambers built up of heat refractory materials that renewals of the metal wall may be conveniently made without a great loss of time and often without cooling down the furnace. For example, a large non-metallic vertical retort set in its heating chamber takes days to cool down sufficiently so that men can get in and tear it down and build up another retort, and then days more of careful heating up so as not to crack the structure before it is up to the working temperature. A worn-out metal retort on the other hand, can be readily pulled out of the top of the furnace structure and replaced by a new metal retort without cooling down the furnace, and with only a short interruption in the furnace operation. A metal retort which has failed due to a bad section of metal, a local hot spot, a burn-off due to air or any other cause may be withdrawn from the heating chamber and a patch or new section welded onto the metal retort and the thus repaired retort replaced in the heating chamber with a minimum shut-down.

Metal has the further advantage of being able to withstand thermal shocks far better than refractory materials. This is particularly important where intermittent charging and discharging are practiced, and where the freshly charged agglomerates are relatively cold. Metal has another advantage, as contrasted with refractory materials, in that it exhibits little tendency to be slagged or stuck up with adhering residues, and hence offers the minimum resistance to the progression of the agglomerated charge through the reducing chamber.

The manner of heating the reducing chamber determines in some measure the nature of the metal to be used in the construction of the chamber wall. The greatest latitude in the choice of metals is permitted when the heating laboratory for the reducing chamber is filled with highly reducing gases, as, for example, when the laboratory is heated by graphite resistors as shown in Figs. 1, 2 and 3 of the drawings. Under these highly reducing conditions wrought iron stands up very satisfactorily. When, however, heat is supplied to the reducing chamber by fire gases (such as from producer or blast furnace gases, oil or coal firing, etc.) it is preferable to construct the metal wall or walls of the reducing chamber of the nickel-chromium-iron alloys or the like because of their resistance at high temperature to oxidizing influences.

By supplying heat to the charge at a temperature level not in excess of 1150° C., I mean that this is the temperature of the metal wall of the retort and consequently the maximum temperature of the heat imparted to the charge at any stage in its working-off and including, of course, worked-off residues to which heat may or must be supplied in the course of the reducing operation. This does not necessarily mean that the temperature in the heating chamber surrounding the reducing chamber may not be higher than 1150° C., since it may be advantageous or even necessary that the temperature of the heating chamber be above 1150° C. in order to drive the heat into the charge at the desired operating temperature level not in excess of 1150° C. For example, it is possible and advantageous in the operation of a vertical metal retort to have the heating chamber at a temperature somewhat above 1150° C., particularly in that part where the charge in the retort contains a relatively high percentage of zinc and where the velocity of gas flowing in the voids of the charge is relatively high and consequently the transfer of heat from the retort wall to the center or core of the charge is very rapid. Under such conditions the metal wall of the retort due to the rapid removal of heat from its inside surface may not attain temperatures even of 1150° C., since the heat absorption by the charge within the retort at the temperature level below 1150° C. is as rapid as heat can be conveyed to the outside of the retort wall. The faster a charge is passed through such a retort, the higher the temperature in the heating chamber may be without departing from the principle of my invention, which is that the heat when it finally reaches the charge in the reducing chamber shall not be supplied to the charge at any stage in its working-off at a temperature level above 1150° C.

This application is a division of the applicant's copending application Serial No. 168,914, filed February 17, 1927.

I claim:

1. In the method of reducing an agglomerated charge of mixed zinciferous material and carbonaceous reducing agent, the steps which comprise progressively advancing the agglomerates through an externally heated upright metal retort without substantial breaking down of the agglomerates during their entire passage through the retort; heating the agglomerates during the course of their passage through the retort to a sufficiently high temperature to reduce compounds of zinc and liberate zinc vapor without slagging or fusing the agglomerated charge, the transfer of heat from the heated wall of the metal retort through the agglomerated charge being effected in large part by currents of hot gases generated within the charge and flowing through the voids thereof towards the gas outlet of the retort, discharging spent residues for the most part in the form of agglomerates from said retort as required for the charging thereto of fresh agglomerates, and withdrawing from the metal retort a gaseous product containing metallic zinc vapor while inhibiting heat dissipation from the upper end of the retort so as to maintain the gaseous product at a temperature adapted substantially to prevent condensation of zinc on the metal retort whereby alloying of zinc with the metal walls and embrittlement of the retort is prevented.

2. In the method of reducing an agglomerated charge of mixed zinciferous material and carbonaceous reducing agent, the steps which comprise progressively advancing the agglomerates through an upright metal reduction retort as liberated zinc vapor and evolved retort gases rise upwardly through the retort, withdrawing the zinc vapor and accompanying gases from the retort to a zinc vapor treatment device while inhibiting heat dissipation from the upper end of the retort so as to maintain the vapor and gases at a temperature adapted substantially to prevent condensation of zinc on the metal retort whereby alloying of zinc with the metal walls and embrittlement of the retort is prevented.

In testimony whereof I affix my signature.

FRANK G. BREYER.